US012703024B2

(12) United States Patent
Lee et al.

(10) Patent No.: US 12,703,024 B2
(45) Date of Patent: Aug. 11, 2026

(54) MACHINE TOOL HAVING INDEPENDENT TYPE TOOL POST

(71) Applicant: HANWHA PRECISION MACHINERY CO., LTD., Changwon-si (KR)

(72) Inventors: Hong Ju Lee, Changwon-si (KR); Deog Geun Kong, Changwon-si (KR); Ji Han Oh, Changwon-si (KR)

(73) Assignee: HANWHA PRECISION MACHINERY CO., LTD., Changwon-si (KR)

( * ) Notice: Subject to any disclaimer, the term of this patent is extended or adjusted under 35 U.S.C. 154(b) by 941 days.

(21) Appl. No.: 17/903,482

(22) Filed: Sep. 6, 2022

(65) Prior Publication Data

US 2022/0410276 A1 Dec. 29, 2022

Related U.S. Application Data

(63) Continuation of application No. PCT/KR2020/017456, filed on Dec. 2, 2020.

(30) Foreign Application Priority Data

Mar. 6, 2020 (KR) ........................ 10-2020-0028175

(51) Int. Cl.
*B23B 25/06* (2006.01)
*B23Q 3/155* (2006.01)
*B23Q 39/02* (2006.01)

(52) U.S. Cl.
CPC .......... *B23B 25/06* (2013.01); *B23Q 3/15539* (2016.11); *B23Q 2003/15531* (2016.11); *B23Q 39/023* (2013.01)

(58) Field of Classification Search
CPC .......... B23Q 2003/15531; B23Q 1/525; B23Q 37/00; B23Q 39/025; B23Q 39/023;
(Continued)

(56) References Cited

U.S. PATENT DOCUMENTS 3,725,987 A * 4/1973 Kurimoto ............... B23B 3/164 29/27 C
4,457,193 A * 7/1984 Matthey ............... B23Q 39/048 82/159
(Continued)

FOREIGN PATENT DOCUMENTS

CN 204843016 U 12/2015
DE 20 2007 008 203 U1 11/2008
(Continued)

OTHER PUBLICATIONS

Communication issued Mar. 1, 2024 by the European Patent Office in European Patent Application No. 20922548.1.
(Continued)

*Primary Examiner* — Sara Addisu
(74) *Attorney, Agent, or Firm* — Sughrue Mion, PLLC

(57) ABSTRACT

A machine tool having a separately replaceable tool post is provided. The machine tool includes supports that are facing each other with an axis line of a main axis in an axial direction therebetween; a rotation tool post detachably connected on one of the supports and rotatable with respect to a first direction perpendicular to the axis line; a fastening member detachably connecting the rotation tool post on the one of the supports, wherein the rotation tool post includes: a rotation unit configured to rotate in the first direction on the one of the supports; an upper fastening unit at an upper portion of the rotation unit, and detachably fastened to the one of the supports; and a lower fastening unit at a lower
(Continued)

portion of the rotation unit, and detachably fastened to the one of the supports so that the rotation unit is rotatable.

20 Claims, 8 Drawing Sheets

(58) Field of Classification Search
CPC ............ B23Q 3/15539; B23Q 3/15526; B23Q 2039/004; B23B 25/06; B23B 29/326
See application file for complete search history.

(56) References Cited

U.S. PATENT DOCUMENTS 4,597,144 A * 7/1986 Frank .................. B23Q 1/5481 408/40
4,730,373 A * 3/1988 Senoh .................. B23Q 1/4828 82/122
4,833,764 A * 5/1989 Muller .................. B23Q 39/02 409/203
D309,146 S * 7/1990 Nemetz ....................... D15/131
5,395,297 A * 3/1995 Takada ............... B23Q 3/15526 483/62
5,669,751 A * 9/1997 Hoffman ................ B23Q 11/08 198/950
6,298,531 B1 * 10/2001 Baumbusch ........... B23Q 1/015 82/129
6,892,613 B2 * 5/2005 Nakaminami ........... B23Q 1/26 82/124
8,297,158 B2 * 10/2012 Watanabe ............ B23Q 16/025 29/27 R
10,099,293 B2 10/2018 Theurillat
2002/0011137 A1 * 1/2002 Nakaminami ......... B23Q 1/015 82/117
2016/0256932 A1 * 9/2016 Theurillat ............ B23B 39/162
2017/0072473 A1 * 3/2017 Kawasumi ............. B23Q 1/628
2017/0136547 A1 * 5/2017 Nakaya .................. B23Q 41/04
2019/0134837 A1 * 5/2019 Sakurai .................... B26D 3/08
2022/0212274 A1 * 7/2022 Niewrzoll ............... B23C 3/128
2022/0379386 A1 * 12/2022 Ishikawa ............... B23B 29/326
2024/0261916 A1 * 8/2024 Stabio ..................... B23C 1/002

FOREIGN PATENT DOCUMENTS

DE 102017122439 A1 * 4/2018 ......... B23Q 3/15539
JP 2003080403 A * 3/2003
JP 2014133299 A * 7/2014 ........... B23Q 39/024
JP 2018075667 A * 5/2018
JP 6546355 B1 * 7/2019 ............. B23Q 7/047
JP 2019-181653 A 10/2019
KR 10-1779332 B1 9/2017
KR 20-0490860 Y1 1/2020

OTHER PUBLICATIONS

Search Report (PCT/ISA/210) issued Mar. 5, 2021 by the International Searching Authority in International Application No. PCT/KR2020/017456.
Written Opinion (PCT/ISA/2137) issued Mar. 5, 2021 by the International Searching Authority in International Application No. PCT/KR2020/017456.

* cited by examiner

MACHINE TOOL HAVING INDEPENDENT TYPE TOOL POST

CROSS-REFERENCE TO RELATED APPLICATIONS

This application is a bypass continuation of International Application No. PCT/KR2020/017456, filed on Dec. 2, 2020, in the Korean Intellectual Property Office, which claims the benefit of Korean Patent Application No. 10-2020-0028175, filed on Mar. 6, 2020, in the Korean Intellectual Property Office, the disclosures of which are incorporated herein by reference in their entireties.

BACKGROUND

Field

Embodiments of the present disclosure relate to a machine tool, for example, to a machine tool having a separately replaceable tool post for enabling various types of inclined processing by installing a rotation tool post rotatable with respect to a vertical axis.

2. DESCRIPTION OF THE RELATED ART

In general, an automatic lathe is a machine tool suitable for mass production of small screws, pins, bolts, nuts, etc. because all operations such as speed change of the main axis, reversal, bar feed, and cutting edge feed are automatically performed. Various types of turning and milling processing can be automatically performed sequentially by relatively transporting several tools attached to the tool post with respect to a bar gripped by the main axis or material to be processed of a deformed bar such as a hexagonal column.

A related art automatic lathe may include a main axis for chucking processing material; a guide bush located on an extension of the main axis to guide a processing material; a sub axis for chucking the other end of the processing material; a front tool post formed in the upper portion of the guide bush for tapping, boring, and drilling; a cross tool post formed in the upper portion of the guide bush for drilling, milling, etc.; an outer diameter tool post for lathe processing such as cutting and threading; and a rear tool post formed in the upper portion of the sub axis for drilling, and milling on the rear surface of the material.

According to the related art, a machine tool may include two comb-tooth-shaped blade holders disposed to face each other across an axis of a supported main axis movable in the axial direction. The comb-tooth-shaped blade holders facing each other are supported in a form capable of movement in the X and Y directions perpendicular to the axial direction of the main axis, respectively, and may be configured to mount tools in parallel in the Y direction. One of the comb-tooth-shaped blade holders facing each other may be provided in a free form to be movable in the Z-direction, which is the same direction as the axial direction of the main axis. In addition, another comb-tooth-shaped blade holder of the comb-tooth-shaped blade holders facing each other is provided to rotate with respect to the Y-axis. To this end, a rotation tool post for supporting the tool so as to be rotatable with respect to the Y-axis along the Y direction is integrally installed on the comb-tooth-shaped blade holder.

However, in the case of the above machine tool, as it has a structure, in which there is one rotation hinge rotating with respect to the Y-axis, if processing is performed using a machine tool that is far from the hinge through this structure, there is a problem in that the machining tool is pushed.

In addition, since processing is performed using a processing tool that is far from the hinge, there is a problem in that the powerful cutting is not performed while pushing the processing tool.

In addition, in the case of an existing machine tool, since it is an integral type that cannot be replaced with a tool, there is a problem in that it is not easy to attach and detach.

In addition, although additional modules or optional tools may be required for additional processing according to the shape or requirements of the object to be processed, there is a problem in that various optional tools cannot be used in the case of the related art machine tools.

In addition, even when performing processing that does not require a rotation tool post, the machine tool is provided with a rotation tool post, so there is a problem in that the processing space is not free.

SUMMARY

According to embodiments of the present disclosure, a machine tool is provided, the machine tool having a separately replaceable tool post by installing a rotation tool post that can rotate with respect to the Y-axis and is easy to attach and detach to and from the machine tool, so that various types of processing can be performed.

According to embodiments of the present disclosure, a machine tool is provided. The machine tool includes: supports that are facing each other with an axis line of a main axis in an axial direction therebetween; a rotation tool post detachably connected on one of the supports and rotatable with respect to a first direction perpendicular to the axis line; and a fastening member including at least one body, the fastening member detachably connecting the rotation tool post on the one of the supports, wherein the rotation tool post includes: a rotation unit including at least one body, the rotation unit configured to rotate in the first direction on the one of the supports; an upper fastening unit including at least one body, the upper fastening unit at an upper portion of the rotation unit, and detachably fastened to the one of the supports; and a lower fastening unit including at least one body, the lower fastening unit at a lower portion of the rotation unit, and detachably fastened to the one of the supports so that the rotation unit is rotatable.

According to one or more embodiments of the present disclosure, the machine tool further includes a connecting unit including at least one body, the connecting unit extending between one side of the upper fastening unit and one side of the lower fastening unit and connects the one side of the upper fastening unit and the one side of the lower fastening unit.

According to one or more embodiments of the present disclosure, the at least one body of the rotation unit includes: a rotation plate that is configured rotate in the first direction between the upper fastening unit and the lower fastening unit; and a tool module detachably provided on one surface of the rotation plate and including at least one tool.

According to one or more embodiments of the present disclosure, the rotation plate includes a 'C' shape.

According to one or more embodiments of the present disclosure, the machine tool further includes: a first hinge unit at an upper portion of the rotation plate and rotatably fastened to the upper fastening unit; and a second hinge unit at a lower portion of the rotation plate and rotatably fastened to the lower fastening unit.

According to one or more embodiments of the present disclosure, at least one fastening hole for inserting the fastening member and enabling fastening to the one of the supports is in the upper fastening unit and the lower fastening unit.

[0(18] According to one or more embodiments of the present disclosure, at least one coupling hole corresponding to the at least one fastening hole is in the one of the supports.

According to one or more embodiments of the present disclosure, the machine tool further includes a driving member including at least one actuator, wherein the driving member is configured to drive the rotation unit and the tool module, and the driving member provided at an upper end of the upper fastening unit.

According to one or more embodiments of the present disclosure, the at least one actuator of the driving member includes: a first driving unit including an actuator, the first driving unit located at an upper portion of one side of the upper fastening unit and is configured to drive one from among the rotation unit and the tool module; and a second driving unit including an actuator, the second driving unit located at an upper portion of another side of the upper fastening unit and is configured to drive the other one from among the rotation unit and the tool module.

According to one or more embodiments of the present disclosure, the machine tool further includes a cross tool unit that is configured to be mounted to a position of the one of the supports, after the rotation tool post is removed from the position of the one of the supports.

According to one or more embodiments of the present disclosure, the machine tool further includes an additional rotation tool post detachably provided on another one of the supports and rotatable with respect to the first direction perpendicular to the axis line, wherein the rotation tool post and the additional rotation tool post are independently attached to the supports, that are facing each other, respectively, and the rotation tool post and the additional rotation tool post face each other, and wherein one from among the rotation tool post and the additional rotation tool post is configured to independently implement inclined processing, or the rotation tool post and the additional rotation tool post are configured to simultaneously implement inclined processing.

According to one or more embodiments of the present disclosure, the at least one body of the fastening member includes: at least one position pin configured to set a fastening position of the rotation tool post, and a fastening bolt adjacent to the at least one position pin, the fastening bolt configured to fix the rotation tool post to the one of the supports.

According to embodiments of the present disclosure, a method of using a machine tool is provided. The method includes: detachably connecting, using a fastening member, a rotation tool post on one of supports of the machine tool such that the rotation tool post is rotatable with respect to a first direction perpendicular to an axis line of a main axis in an axial direction, wherein the supports are facing each other with the axis line of the main axis in the axial direction therebetween, wherein the fastening member includes at least one body, and the fastening member detachably connects the rotation tool post on the one of the supports, and wherein the rotation tool post, that is detachably connected to the one of the supports, includes: a rotation unit including at least one body, the rotation unit configured to rotate in the first direction on the one of the supports; an upper fastening unit including at least one body, the upper fastening unit provided at an upper portion of the rotation unit, and detachably fastened to the one of the supports; and a lower fastening unit including at least one body, the lower fastening unit provided at a lower portion of the rotation unit, and detachably fastened to the one of the supports so that the rotation unit is rotatable.

According to one or more embodiments of the present disclosure, a connecting unit, that includes at least one body, extends between one side of the upper fastening unit and one side of the lower fastening unit and connects the one side of the upper fastening unit and the one side of the lower fastening unit.

According to one or more embodiments of the present disclosure, the at least one body of the rotation unit includes: a rotation plate that is configured rotate in the first direction between the upper fastening unit and the lower fastening unit; and a tool module detachably provided on one surface of the rotation plate and including at least one tool.

According to one or more embodiments of the present disclosure, a first hinge unit is at an upper portion of the rotation plate and is rotatably fastened to the upper fastening unit, and a second hinge unit is at a lower portion of the rotation plate and is rotatably fastened to the lower fastening unit.

According to one or more embodiments of the present disclosure, the detachably connecting the rotation tool post includes inserting the fastening member into at least one fastening hole in the upper fastening unit and the lower fastening unit.

According to one or more embodiments of the present disclosure, the method further includes: detaching the rotation tool post from a position of the one of the supports; and detachably connecting a cross tool unit to the position of the one of the supports after the rotation tool post is detached.

According to one or more embodiments of the present disclosure, the machine tool further includes an additional rotation tool post detachably provided on another one of the supports and rotatable with respect to the first direction perpendicular to the axis line, the rotation tool post and the additional rotation tool post are independently attached to the supports, that are facing each other, respectively, and the rotation tool post and the additional rotation tool post face each other, and the method further includes performing an inclined processing with only one from among the rotation tool post and the additional rotation tool post, or with the rotation tool post and the additional rotation tool post, simultaneously.

According to one or more embodiments of the present disclosure, the at least one body of the fastening member includes: at least one position pin configured to set a fastening position of the rotation tool post, and a fastening bolt adjacent to the at least one position pin, the fastening bolt configured to fix the rotation tool post to the one of the supports.

However, aspects of embodiments of the present disclosure are not restricted to those set forth above. The above and other aspects will become more apparent to one of ordinary skill in the art to which the disclosure pertains by referencing the detailed description of the present disclosure given below.

BRIEF DESCRIPTION OF DRAWINGS

These and/or other aspects will become apparent and more readily appreciated from the following description of non-limiting example embodiments of the present disclosure, taken in conjunction with the accompanying drawings in which.

DETAILED DESCRIPTION

Figure 1:
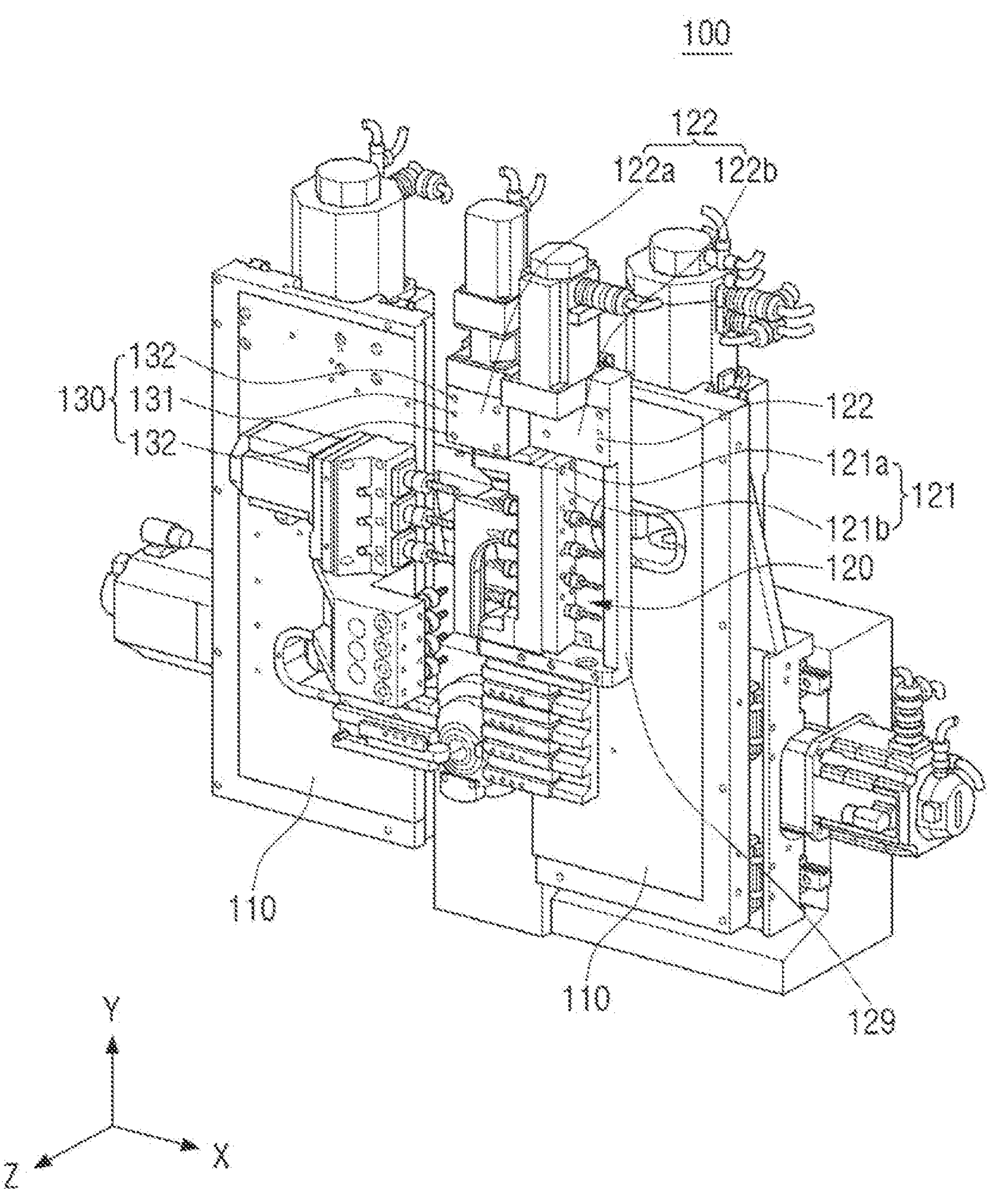
FIG. 1 is a schematic perspective view of a machine tool having a separately replaceable tool post according to an embodiment of the present disclosure.

Advantages and features of embodiments of the present disclosure and methods to achieve them will become apparent from the descriptions of non-limiting example embodiments herein below with reference to the accompanying drawings. However, the present disclosure is not limited to the example embodiments disclosed herein and may be implemented in various ways. The example embodiments are provided for making the present disclosure thorough and for fully conveying the scope of the present disclosure to those skilled in the art. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word “comprise” and variations such as “comprises” or “comprising,” will be understood to imply the inclusion of stated elements but not the exclusion of any other elements.

It will be understood that when an element is referred to as being “over,” “above,” “on,” “below,” “under,” “beneath,” “connected to” or “coupled to” another element, it can be directly over, above, on, below, under, beneath, connected or coupled to the other element or intervening elements may be present. In contrast, when an element is referred to as being “directly over,” “directly above,” “directly on,” “directly below,” “directly under,” “directly beneath,” “directly connected to” or “directly coupled to” another element, there are no intervening elements present.

Hereinafter, non-limiting example embodiments of the present disclosure will be described in detail with reference to the accompanying drawings.

Hereinafter, with reference to the accompanying drawings, a configuration of a machine tool 100 having a separately replaceable tool post according to an embodiment of the present disclosure will be described in detail.

Figure 2:
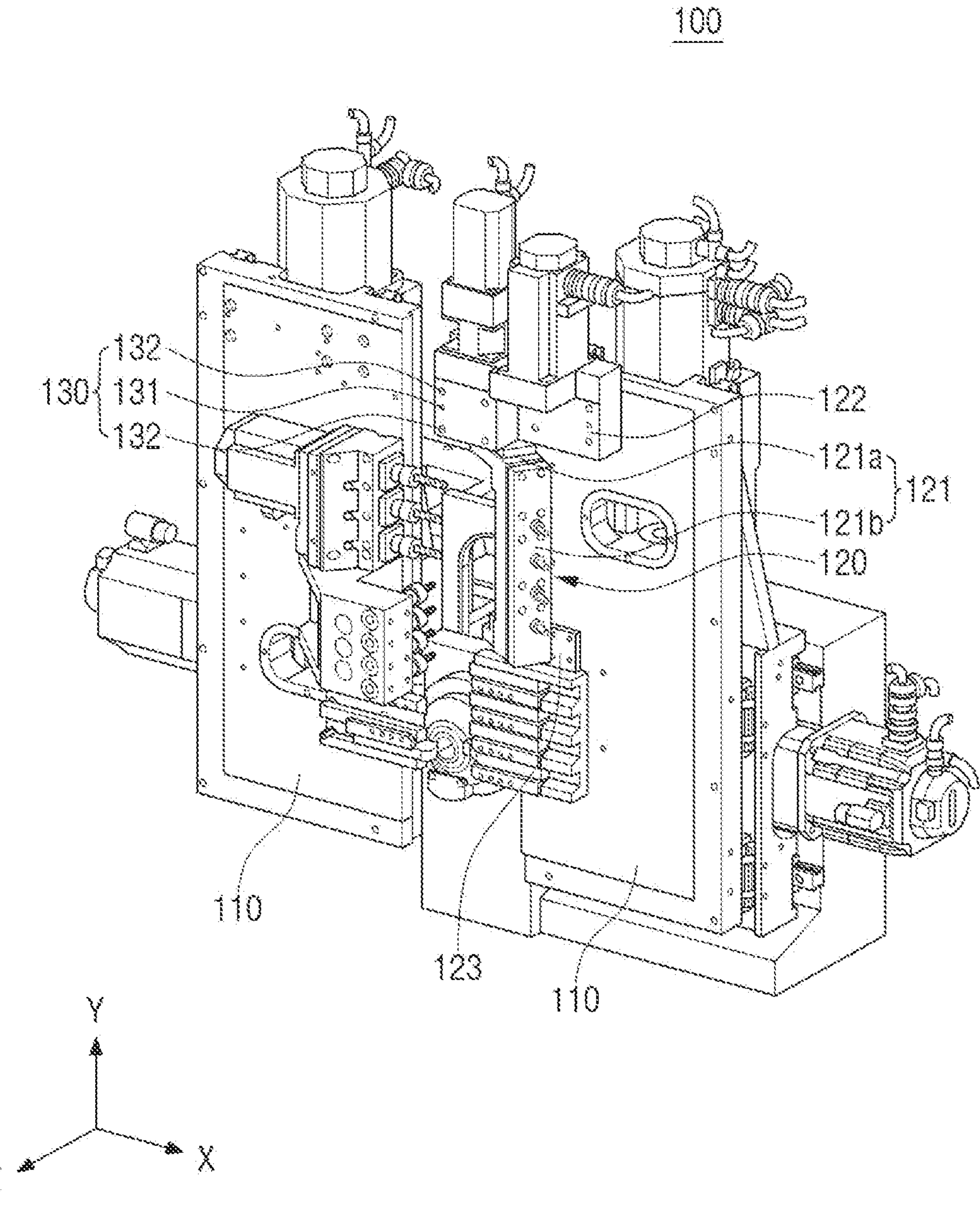
FIG. 2 is a perspective view schematically showing a driving state of a rotation tool post in the machine tool according to an embodiment of the present disclosure.
Figure 3:
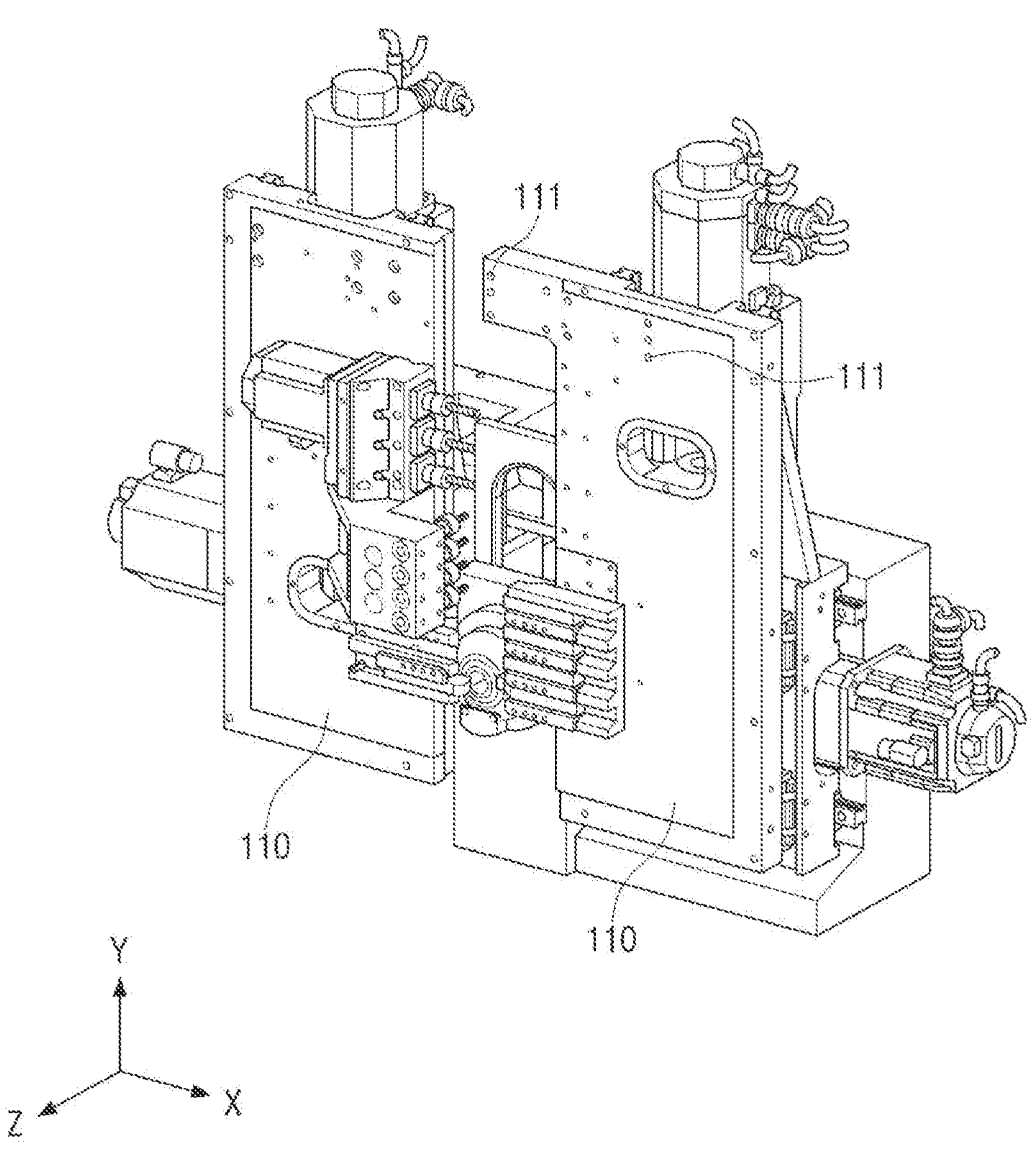
FIG. 3 is a perspective view schematically showing a support, from which the rotation tool post is removed in a machine tool, according to an embodiment of the present disclosure.
Figure 4:
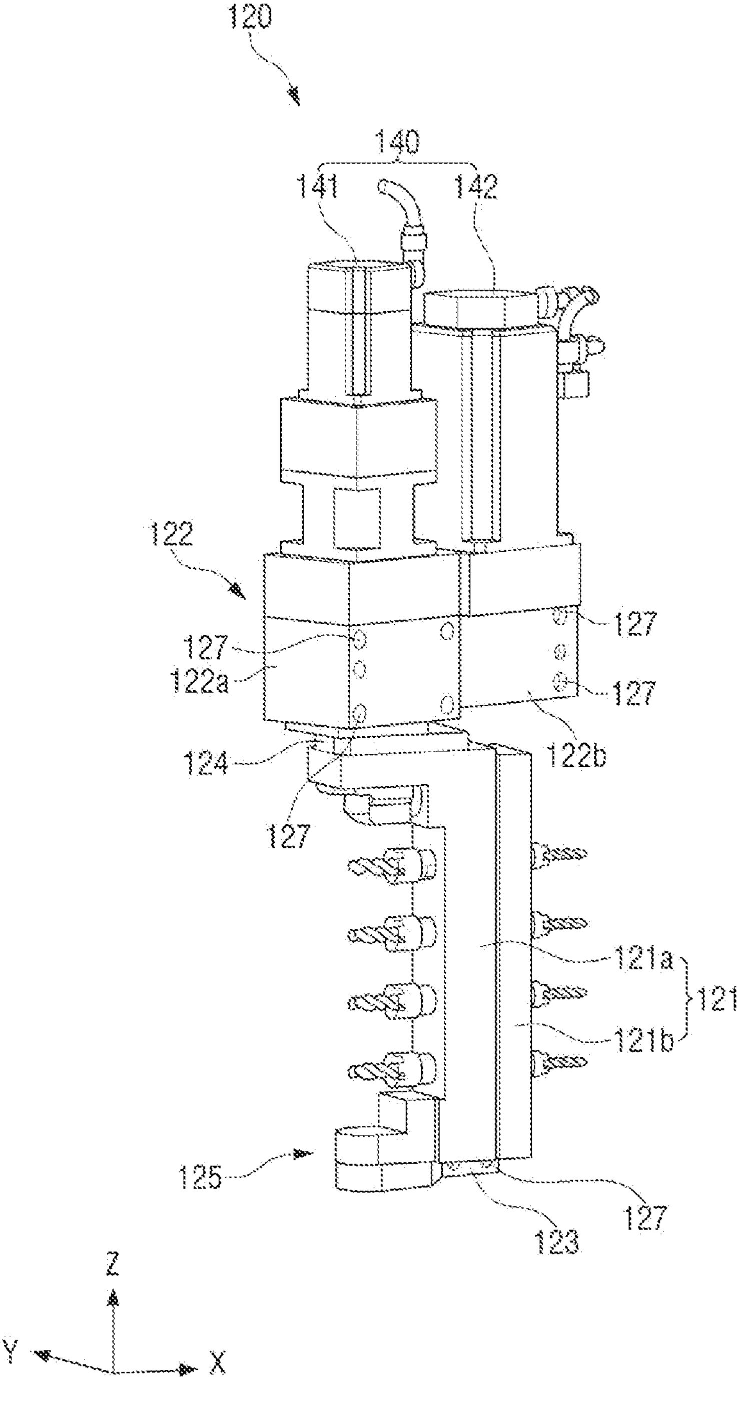
FIG. 4 is a perspective view schematically showing the rotation tool post separated from the support in a machine tool according to an embodiment of the present disclosure.

FIG. 1 is a schematic perspective view of a machine tool 100 having a separately replaceable tool post according to an embodiment of the present disclosure. FIG. 2 is a perspective view schematically showing a driving state of the rotation tool post 120 in the machine tool 100 according to an embodiment of the present disclosure. FIG. 3 is a perspective view schematically showing supports 110, wherein from one of which the rotation tool post is removed in a machine tool 100, according to an embodiment of the present disclosure. FIG. 4 is a perspective view schematically showing the rotation tool post 120 separated from the one of the supports 110 in a machine tool 100 according to an embodiment of the present disclosure.

Referring to FIGS. 1 to 4, a machine tool according to an embodiment of the present disclosure includes a machine tool 100, wherein the machine tool 100 may include supports 110, a rotation tool post 120, and a fastening member 130, and may include a cross tool unit 150 (see FIGS. 5 to 7) that is selectively fastened to the rotation tool post 120 at a fastening position of the rotation tool post 120 in a state, in which the rotation tool post 120 is removed from the at least one of the supports 110.

The supports 110 according to an embodiment of the present disclosure may be disposed to face each other with the axis of the main axis in the axial direction therebetween. That is, the supports 110 may be provided to be slidably movable in the X-axis and Y-axis directions while being disposed on the machine tool along the Z-axis. The supports 110 may be mounted to face each other in the X-axis direction in the machine tool. At least one of the supports 110 facing each other may be provided with a rotation tool post 120 to be described later, and the rotation tool post 120 may be detachably provided on the at least one of the supports 110. For example, when the rotation tool post 120 is not provided, the tool post (hereinafter, the cross tool unit 150) may be detached and attached to the at least one of the supports 110 instead of the rotation tool post 120. A coupling hole 111 (refer to FIG. 3) for coupling the rotation tool post 120 to be described later may be formed in the at least one of the supports 110.

The rotation tool post 120 according to an embodiment of the present disclosure may be detachably provided on the at least one of the supports 110. For example, only one of two supports 110 located in the machine tool may be provided with the rotation tool post 120, and the other one of the two supports 110 may be provided with the fixed tool post integral therewith. On the contrary, both of the two supports 110 located in the machine tool may be provided with the rotation tool post 120. A specific configuration of the rotation tool post 120 will be described later.

The fastening member 130 according to an embodiment of the present disclosure may detachably provide the rotation tool post 120 to the at least one of the supports 110.

In an embodiment of the present disclosure, the fastening member 130 may include a position pin 131 and a fastening bolt 132.

The position pin 131 may be a configuration for guiding the fastening bolt 132 before the fastening bolt 132 is fastened so that when the rotation tool post 120 or the cross tool unit 150 is attached to the at least one of the supports 110, wherein the position pin 131 can be engaged with the position to be attached. At least one of the position pin 131 may be provided. For example, a plurality of the position pin 131 may be respectively provided on both ends of an upper fastening unit 122 to be described later, and at least one of the plurality of the position pin 131 may be provided on the peripheral surfaces of a lower fastening unit 123. However, the number of the position pin 131 is not limited thereto, and it can be changed or modified according to the size or fastening position of the rotation tool post 120 or the cross tool unit 150 or the position of the fastening bolt 132. In addition, the position pin 131 according to an embodiment of the present disclosure may be configured in a specific pattern or in the form of a hole on one side corresponding to each of the at least one of the supports 110 and the rotation tool post 120. As the position pin 131 is configured, it is possible to easily set mounting positions of the tool modules (e.g., the rotation tool post 120 and the cross tool unit 150) that are detached and attached to the at least one of the supports 110. In addition, the position pin 131 may be provided in the upper fastening unit 122, but may not be provided in the lower fastening unit 123.

The position pin 131 may be provided to fit into a hole formed in the rotation tool post 120 or the cross tool unit 150 and a hole formed in the at least one of the supports 110 engaged therewith. Also, according to embodiments, the position pin 131 may be protruded from the rotation tool post 120 or the cross tool unit 150, and may be provided to fit into a hole formed in the at least one of the supports 110 to be engaged therewith. In addition, according to embodiments, a configuration may be provided, in which the position pin 131 is inserted into a hole formed in the rotation tool post 120 or the cross tool unit 150 after the position pin 131 is fitted and coupled to a hole formed in the at least one of the supports 110. However, the configuration of the position pin 131 is not limited to the above-described configurations, and any configuration may be provided (including modifications of the above-described configurations) such that, when attaching the rotation tool post 120 or the cross tool unit 150 to the at least one of the supports 110, the attachment position can be guided before fastening.

The fastening bolt 132 is configured to couple and fix the rotation tool post 120 or the cross tool unit 150 to the at least one of the supports 110. The fastening bolt 132 may be provided at a position adjacent to the position pin 131. For example, a plurality of the fastening bolt 132 may be respectively disposed above and below a plurality of the position pin 131 on both sides of the upper fastening unit 122, and one or more of the fastening bolt 132 may be provided at the center of the upper fastening unit 122. In addition, three of the fastening bolt 132 may be provided along the circumferential surface of the lower fastening unit 123.

That is, as described above, three holes are configured on both sides of the upper fastening unit 122 according to an embodiment of the present disclosure, and two holes may be formed in the center of both sides of the upper fastening unit 122. The three holes on both sides are respectively provided with a plurality of the fastening bolt 132 arranged with respect to each other in a vertical direction, and a position pin 131 may be provided in the hole between an upper and lower one of the fastening bolt 132. In addition, the two holes in the center of both sides of the upper fastening unit 122 may include therein respective ones of the fastening bolt 132. However, the configuration (e.g., the shape, position, and structure) of the fastening bolt 132 and the position pin 131 can be changed or modified depending on the configuration of the rotation tool post 120 (or the cross tool unit 150) and the at least one of the supports 110.

As described above, the rotation tool post 120 according to an embodiment of the present disclosure may be detachably provided on at least one of the supports 110, facing each other, so as to be rotatable in a first direction perpendicular to the axis line.

The rotation tool post 120 may include a rotation unit 121, an upper fastening unit 122, a lower fastening unit 123, a first hinge unit 124, a second hinge unit 125, and a driving member 140.

The rotation unit 121 may be provided to rotate in the first direction on the at least one of the supports 110, and may be provided to rotate with respect to the first axis by the first hinge unit 124 and the second hinge unit 125, to be described later, at the upper fastening unit 122 and the lower fastening unit 123.

The rotation unit 121 may include a rotation plate 121*a* and a tool module 121*b*.

The rotation plate 121*a* may be provided to rotate in the first direction between the upper fastening unit 122 and the lower fastening unit 123. In one embodiment of the present disclosure, the rotation plate 121*a* may be described as being formed in a 'C' shape as an example. In addition, between one side of the upper fastening unit 122 and one side of the lower fastening unit 123, a connecting unit 129 connecting the upper fastening unit 122 and the lower fastening unit 123 may be configured to be extended, and configured as a single body with the upper fastening unit 122 and the lower fastening unit 123 (see FIG. 1). However, with reference to FIGS. 1 and 2, in the case of FIG. 1, the rotation tool post 120 having the connecting unit 129 is shown, and in the case of FIG. 2, the rotation tool post 120, in which the connecting unit 129 is not provided, is shown. As such, the configuration of the connecting unit 129 may or may not be provided according to various embodiments, and the configuration, including shape, of the connecting unit 129 may be variously modified.

In the rotation plate 121*a*, that is 'C'-shaped, an upper portion of the rotation plate 121*a* may be referred to as a first surface, a lower portion may be referred to as a second surface, and a surface between the first surface and the second surface may be referred to as a third surface. The upper fastening unit 122 may be located above the first surface, and may be rotatably coupled by the first hinge unit 124 between the first surface and the upper fastening unit 122. The lower fastening unit 123 may be located below the second surface, and may be rotatably coupled by the second hinge unit 125 between the second surface and the lower fastening unit 123. A tool module 121*b* to be described later may be detachably mounted on the third surface. That is, the upper fastening unit 122 and the lower fastening unit 123 may also be configured in a 'C' shape. Accordingly, the rotation plate 121*a* may be configured in a 'C' shape that is rotated between the 'C' shape of the upper fastening unit 122 and the lower fastening unit 123.

The tool module 121*b* may be detachably provided on one surface (e.g., the third surface described above) of the rotation plate 121*a*, and at least one tool may be mounted thereon. In addition, the tool module 121*b* may be provided to cut the product while rotating. As the tool module 121*b* is detachably provided at the rotation plate 121*a*, the tool module 121*b* may be replaced as needed for cutting. As the tool module 121*b* is provided to be replaceable at the rotation plate 121*a*, various processing such as screw processing, side cutting, polygon processing, etc. can be implemented by replacing the tool module 121*b*.

The upper fastening unit 122 according to an embodiment of the present disclosure may be provided at the rotation unit 121, specifically, at the upper portion of the rotation plate 121*a*, and may be detachably provided on at least one of the supports 110 by the fastening member 130.

The upper fastening unit 122 may be divided into a first region 122*a* and a second region 122*b*.

The first region 122*a* may be provided such that the rotation unit 121 is rotatably coupled.

The second region 122*b* may be formed to be stepped from the first region 122*a* and may extend in the axial direction from the first region 122*a*.

The first region 122*a* and the second region 122*b* may be formed in a rectangular shape, respectively, and at respective corner positions around the perimeter of the first region 122*a* and the perimeter of the second region 122*b*, a fastening hole 127 penetrating the at least one of the supports 110 side may be formed.

The fastening hole 127 may be provided to correspond to the position of the mounting hole, and as the fastening member 130 is inserted and coupled in a state where the fastening hole 127 and the mounting hole have a corresponding position, the rotation tool post 120 may be fastened to the at least one of the supports 110.

The lower fastening unit 123 may be provided at the rotation unit 121, specifically, at the lower portion of the rotation plate 121*a*. The lower fastening unit 123 may be detachably coupled to the at least one of the supports 110 by the fastening member 130. The lower fastening unit 123 may be formed in a rectangular shape, and a fastening hole 127 penetrating the at least one of the supports 110 side may be formed at a corner position around the perimeter of the lower fastening unit 123. Accordingly, as a plurality of the fastening member 130 is inserted and fixed into the plurality of the fastening hole 127 formed in the upper fastening unit 122 and the lower fastening unit 123, the rotation tool post 120 can be coupled and fixed to the at least one of the supports 110.

The first hinge unit 124 may be provided at the upper end of the rotation unit 121, and may be provided between the first region 122*a* of the upper fastening unit 122 and the rotation plate 121*a*, and may be provided such that the rotation unit 121 is rotatable with respect to the first axis. In an embodiment of the present disclosure, the first hinge unit 124 may include an upper groove formed in the first region 122*a* of the upper fastening unit 122 and an upper protrusion protruding from the rotation plate 121*a* in the direction of the upper groove, or vice versa.

The second hinge unit 125 may be provided at the lower end of the rotation unit 121, and may be provided between the lower portion of the rotation plate 121*a* and the lower fastening unit 123, and may be provided such that the rotation unit 121 is rotatable with respect to the first axis. In an embodiment of the present disclosure, the second hinge unit 125 may include a lower groove formed in the lower fastening unit 123 and a lower protrusion (not shown) protruding from the lower portion of the rotation plate 121*a* in the direction of the lower groove, or vice versa.

In addition, one of the upper protrusion and the lower protrusion is provided to be elastically driven, so that when the rotation unit 121 is inserted between the upper fastening unit 122 and the lower fastening unit 123 and coupled, the rotation unit 121 can be fitted and coupled as it is elastically driven.

As the rotation unit 121 is coupled up and down by the first hinge unit 124 and the second hinge unit 125, it is possible to prevent the tool module 121*b* from being pushed during cutting so that powerful cutting is possible.

A driving member 140 for driving the rotation unit 121 and the tool module 121*b* may be provided at an upper end of the upper fastening unit 122. According to embodiments, the driving member 140 may include at least one actuator (e.g., a motor).

The driving member 140 may include a first driving unit 141 and a second driving unit 142.

The first driving unit 141 may be located above the first region 122*a* to drive one from among the rotation unit 121 and the tool module 121*b*.

In addition, the second driving unit 142 may be located above the second region 122*b* to drive the other one from among the rotation unit 121 and the tool module 121*b*.

For example, the first driving unit 141 may be provided for driving the rotation of the rotation unit 121, and the second driving unit 142 may be provided for driving the rotation of the tool module 121*b*. In addition, the first driving unit 141 may be located at the upper end of the first region 122*a*, and the second driving unit 142 may be located at the upper portion of the second region 122*b*.

As described above, a plurality of the rotation tool post 120 may be independently attached to the supports 110 facing each other, and the plurality of the rotation tool post 120 may face each other. In addition, one of the plurality of the rotation tool post 120 may implement the inclined process alone, or the plurality of the rotation tool post 120 facing each other may implement the inclined process at the same time.

As described above, the rotation tool post 120 is detachably provided on the at least one of the supports 110 to perform cutting, and the machine tool may perform cutting that does not require the rotation tool post 120. Accordingly, the rotation tool post 120 attached to one of the supports 110 may be removed from the machine tool, and the cutting process may be performed only with the tool post attached to the other one of the supports 110. Alternatively, a tool post (e.g., cross tool unit 150) for other cutting may be attached to the position of the one of the supports 110 from which the rotation tool post 120 was removed.

Figure 5:
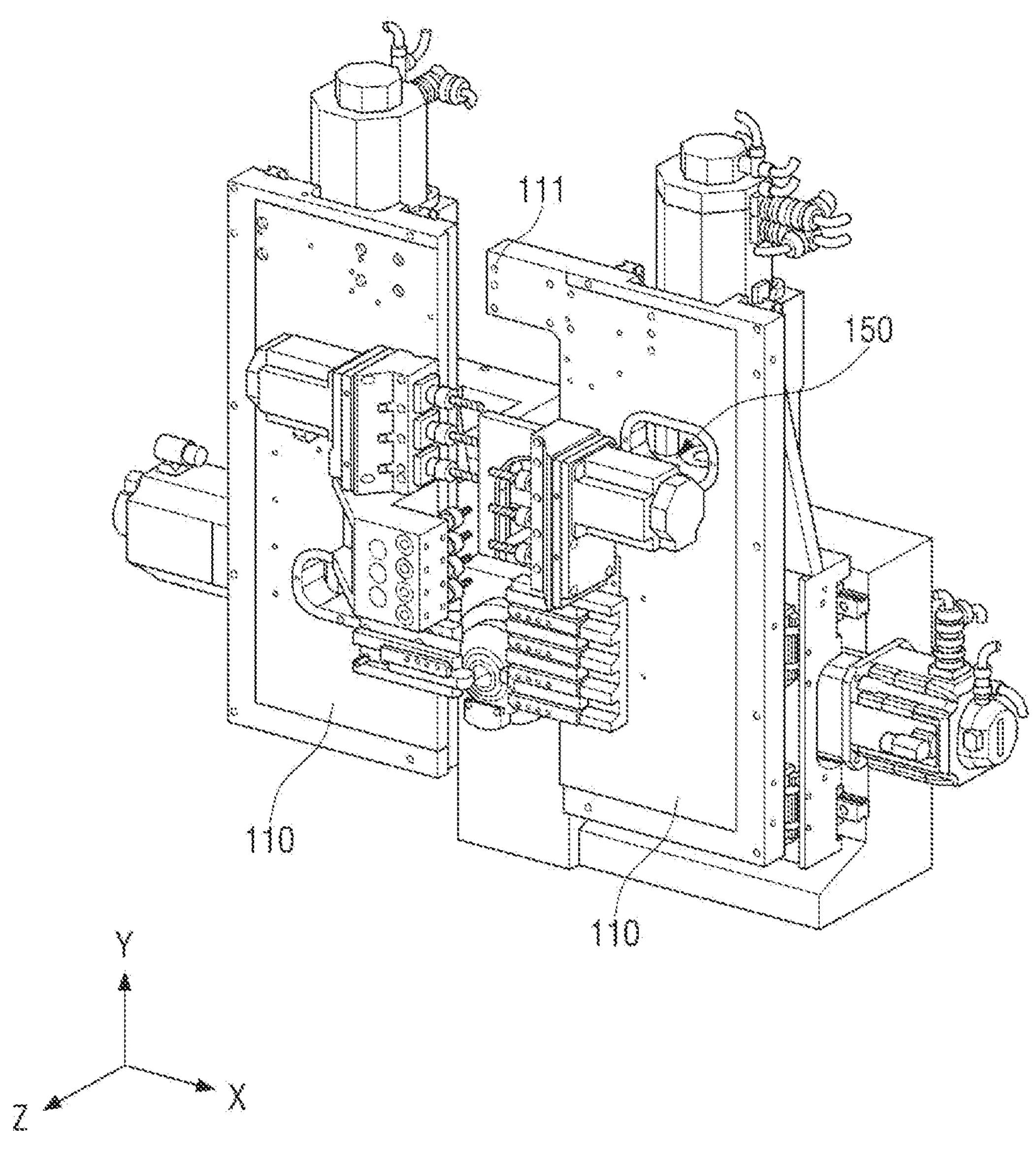
FIG. 5 is a perspective view schematically showing the machine tool, in which a cross tool unit is fastened to the support, from which the rotation tool post is removed, in the machine tool having the separately replaceable tool post according to an embodiment of the present disclosure.
Figure 6:
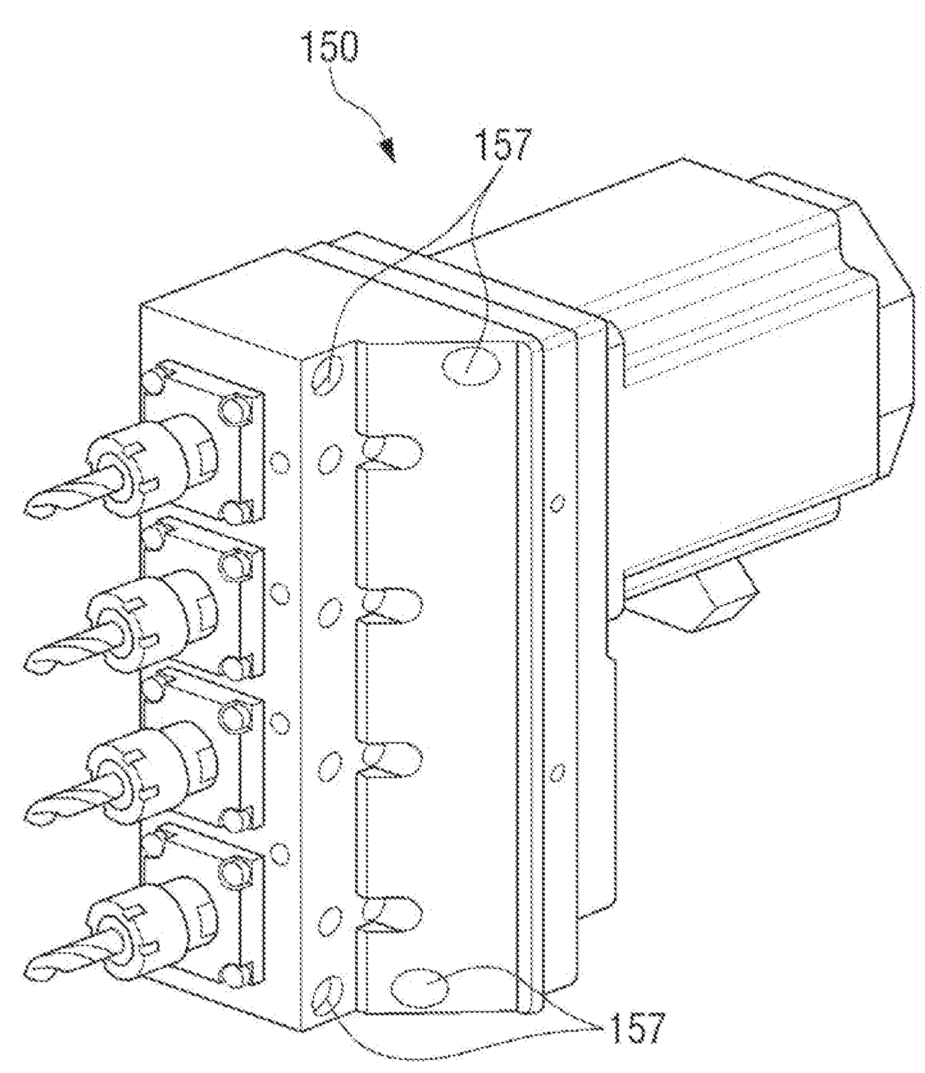
FIG. 6 is a perspective view schematically showing a cross tool unit in a machine tool having a separately replaceable tool post according to an embodiment of the present disclosure.
Figure 7:
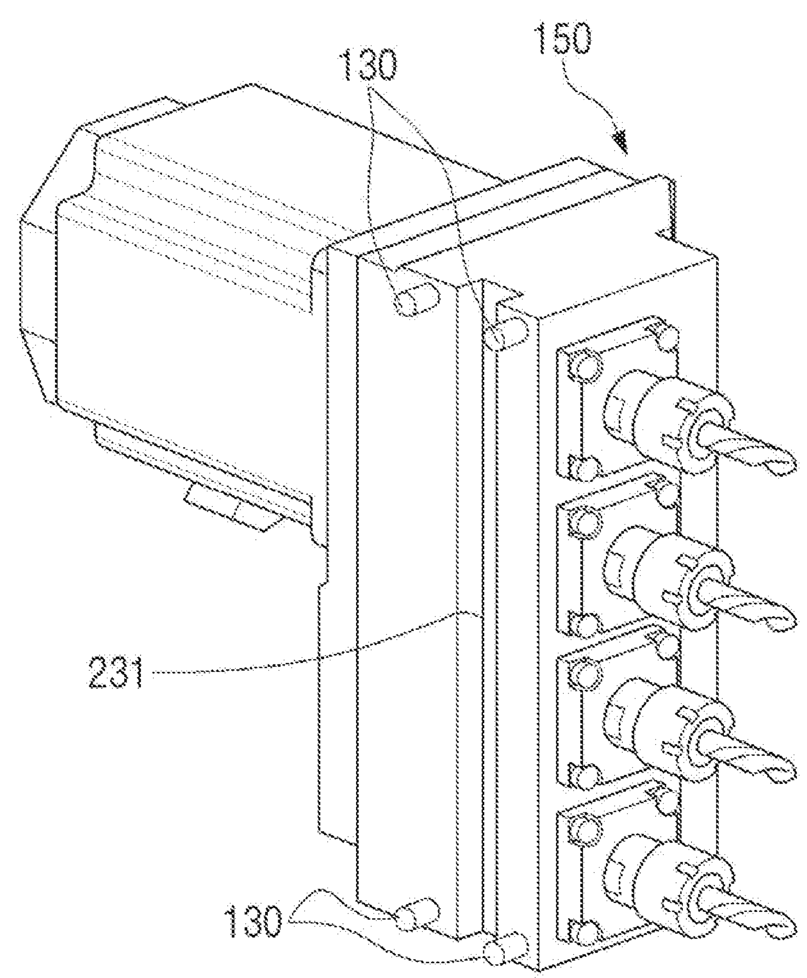
FIG. 7 is a perspective view in another direction of the cross tool unit in the machine tool having the separately replaceable tool post according to an embodiment of the present disclosure.
Figure 8:
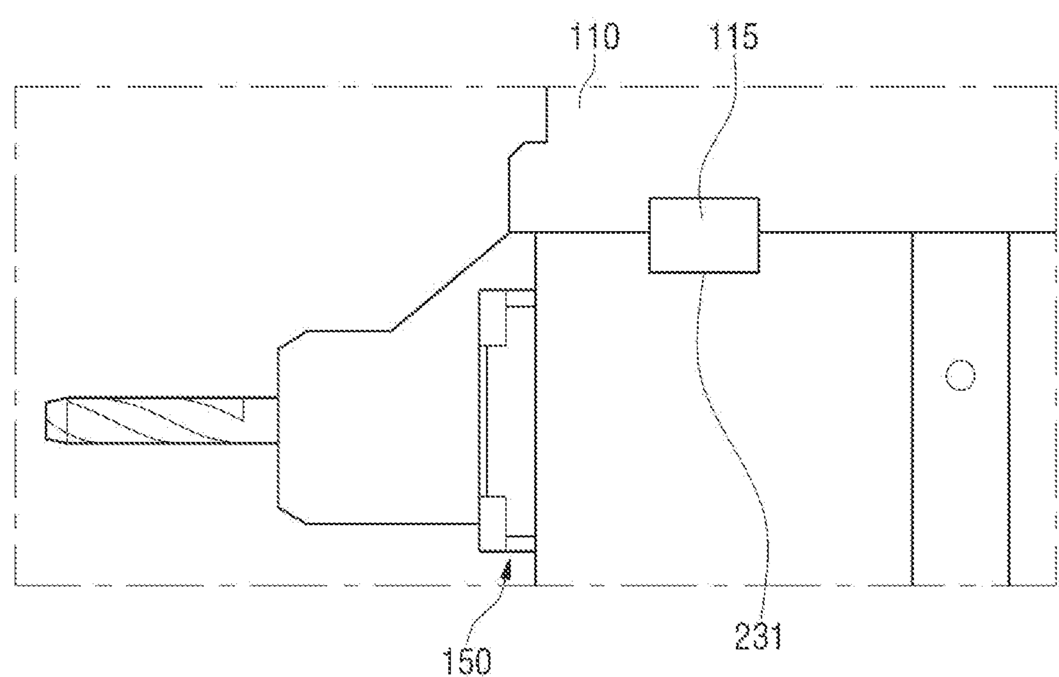
FIG. 8 is a partial plan view of a state, in which a cross tool unit is mounted in a machine tool having a separately replaceable tool post according to an embodiment of the present disclosure.

FIG. 5 is a perspective view schematically showing the machine tool 100, in which a cross tool unit 150 is fastened to at least one of the supports 110, from which the rotation tool post 120 was removed, in the machine tool 100 having the separately replaceable tool post according to an embodiment of the present disclosure. FIG. 6 is a perspective view schematically showing a cross tool unit 150 in a machine tool 100 having a separately replaceable tool post according to an embodiment of the present disclosure. FIG. 7 is a perspective view in another direction of the cross tool unit 150 in the machine tool 100 having the separately replaceable tool post according to an embodiment of the present disclosure. FIG. 8 is a partial plan view of a state, in which a cross tool unit 150 is mounted in a machine tool 100 having a separately replaceable tool post according to an embodiment of the present disclosure.

Referring to FIGS. 5 to 8, the rotation tool post 120 may be replaced with the cross tool unit 150 capable of performing another cutting and it may be attached to the position of the at least one the supports 110 where the rotation tool post 120 is removed according to embodiments of the present disclosure.

The cross tool unit 150 is a tool post that does not require rotation with respect to the first axis, and can implement various processing that can perform cutting without requiring rotation.

Accordingly, fastening holes 157 for coupling to the at least one of the supports 110 may be provided in the cross tool unit 150 at upper and lower positions of the cross tool unit 150. A position determining unit 231 for guiding the position of the cross tool unit 150 before a plurality of the fastening bolt 132 is fastened may be provided so that the fastening member 130 can be engaged with the position to be attached before and when the fastening member 130 is fastened to the at least one of the supports 110 through the fastening holes 157 of the cross tool unit 150. The position determining unit 231 may have the same structure as the position pin 131 described with reference to FIGS. 1 to 4. However, as shown in FIGS. 7 and 8, the position determining unit 231 may be implemented as a long groove shape in the Y-axis direction perpendicular to one side of the cross tool unit 150. As the groove shape of the position determining unit 231 is inserted into engagement with a position protrusion 115 formed in the at least one of the supports 110, before the fastening member 130 is fastened, the cross tool unit 150 may be accurately engaged with the seating position of the at least one of the supports 110.

In a machine tool having a separately replaceable tool post according to an embodiment of the present disclosure, by installing a rotation tool post rotatable about the Y-axis on an independent facing tool post type machine tool, the machine tool has the advantage of enabling various types of processing, for example, inclined processing such as tapping processing and drilling processing.

In addition, the machine tool having a separately replaceable tool post according to an embodiment of the present disclosure has the advantage that powerful cutting is possible using any tool because the rotation tool post is hinged up and down.

In addition, in the machine tool having a separately replaceable tool post according to an embodiment of the present disclosure, the processing tool of the rotation tool post applies a replaceable modular type tool, so when replacing the tool module, the tool corresponding to the set additional processing such as screw processing, side cutting, and polygon processing can be easily replaced, so that various processing is possible.

In addition, the machine tool having a separately replaceable tool post according to an embodiment of the present disclosure has the advantage of enabling attachment and detachment of the rotation tool post only by simple attachment and detachment of the fastening member when at least one of the rotation tool posts facing each other is unnecessary.

In addition, the machine tool having a separately replaceable tool post according to an embodiment of the present disclosure can mount various processing tool units at the position of the separated rotation tool post, thereby enabling various processing.

Many modifications and other embodiments of the present disclosure will come to the mind of one skilled in the art having the benefit of the teachings presented in the foregoing descriptions and the associated drawings. Therefore, it is understood that the present disclosure is not to be limited to the example embodiments described, and that modifications and other embodiments are intended to be included within the scope of the present disclosure.

What is claimed is:

1. A machine tool comprising:

supports with an axis line of a main axis in an axial direction therebetween;

a rotation tool post detachably connected on one of the supports and rotatable with respect to a first direction perpendicular to the axis line; and a fastening member comprising at least one body, the fastening member detachably connecting the rotation tool post on the one of the supports, wherein the rotation tool post comprises:

a rotation unit comprising at least one body, the rotation unit configured to rotate in the first direction on the one of the supports;

an upper fastening unit comprising at least one body, the upper fastening unit at an upper portion of the rotation unit, and detachably fastened to the one of the supports;

a lower fastening unit comprising at least one body, the lower fastening unit at a lower portion of the rotation unit, and detachably fastened to the one of the supports so that the rotation unit is rotatable;

a first hinge unit at an upper portion of the rotation unit and rotatably fastened to the upper fastening unit; and a second hinge unit at a lower portion of the rotation unit and rotatably fastened to the lower fastening unit.

2. The machine tool of claim 1, wherein the rotation tool post further comprises a connecting unit comprising at least one body, the connecting unit extending between one side of the upper fastening unit and one side of the lower fastening unit and connects the one side of the upper fastening unit and the one side of the lower fastening unit.

3. The machine tool of claim 1, wherein the at least one body of the rotation unit comprises:

a rotation plate that is configured rotate in the first direction between the upper fastening unit and the lower fastening unit; and a tool module detachably provided on one surface of the rotation plate and comprising at least one tool.

4. The machine tool of claim 3, wherein the rotation plate comprises a 'C' shape.

5. The machine tool of claim 3, wherein the first hinge unit is at an upper portion of the rotation plate and rotatably fastened to the upper fastening unit, and the second hinge unit is at a lower portion of the rotation plate and rotatably fastened to the lower fastening unit.

6. The machine tool of claim 5, wherein at least one fastening hole for inserting the fastening member and enabling fastening to the one of the supports is in the upper fastening unit and the lower fastening unit.

7. The machine tool of claim 6, wherein at least one coupling hole corresponding to the at least one fastening hole is in the one of the supports.

8. The machine tool of claim 3, wherein the rotation tool post further comprises a driving member comprising at least one actuator, wherein the driving member is configured to drive the rotation unit and the tool module, and the driving member provided at an upper end of the upper fastening unit.

9. A machine tool comprising:

supports with an axis line of a main axis in an axial direction therebetween;

a rotation tool post detachably connected on one of the supports and rotatable with respect to a first direction perpendicular to the axis line; and a fastening member comprising at least one body, the fastening member detachably connecting the rotation tool post on the one of the supports, wherein the rotation tool post comprises:

a rotation unit comprising at least one body, the rotation unit configured to rotate in the first direction on the one of the supports;

an upper fastening unit comprising at least one body, the upper fastening unit at an upper portion of the rotation unit, and detachably fastened to the one of the supports;

a lower fastening unit comprising at least one body, the lower fastening unit at a lower portion of the rotation unit, and detachably fastened to the one of the supports so that the rotation unit is rotatable; and a driving member comprising at least one actuator, wherein the driving member is configured to drive the rotation unit and the tool module, and the driving member provided at an upper end of the upper fastening unit;

wherein the at least one actuator of the driving member comprises:

a first driving unit comprising an actuator, the first driving unit located at an upper portion of one side of the upper fastening unit and is configured to drive one from among the rotation unit and the tool module; and a second driving unit comprising an actuator, the second driving unit located at an upper portion of another side of the upper fastening unit and is configured to drive the other one from among the rotation unit and the tool module.

10. The machine tool of claim 8, further comprising a cross tool unit that is configured to be mounted to a position of the one of the supports, after the rotation tool post is removed from the position of the one of the supports, wherein the cross tool unit is configured to perform cutting without rotating in the first direction.

11. The machine tool of claim 1, further comprising an additional rotation tool post detachably provided on another one of the supports and rotatable with respect to the first direction perpendicular to the axis line, and wherein the rotation tool post and the additional rotation tool post are independently attached to the supports, respectively, and the rotation tool post and the additional rotation tool post face each other.

12. The machine tool of claim 1, wherein the at least one body of the fastening member comprises:

at least one position pin configured to set a fastening position of the rotation tool post, and a fastening bolt adjacent to the at least one position pin, the fastening bolt configured to fix the rotation tool post to the one of the supports.

13. A method of using a machine tool, the method comprising:

detachably connecting, using a fastening member, a rotation tool post on one of supports of the machine tool such that the rotation tool post is rotatable with respect to a first direction perpendicular to an axis line of a main axis in an axial direction, wherein the axis line of the main axis in the axial direction is between the supports, wherein the fastening member comprises at least one body, and the fastening member detachably connects the rotation tool post on the one of the supports, wherein the rotation tool post, that is detachably connected to the one of the supports, comprises:

a rotation unit comprising at least one body, the rotation unit configured to rotate in the first direction on the one of the supports;

an upper fastening unit comprising at least one body, the upper fastening unit provided at an upper portion of the rotation unit, and detachably fastened to the one of the supports;

a lower fastening unit comprising at least one body, the lower fastening unit provided at a lower portion of the rotation unit, and detachably fastened to the one of the supports so that the rotation unit is rotatable;

a first hinge unit at an upper portion of the rotation unit and rotatably fastened to the upper fastening unit; and a second hinge unit at a lower portion of the rotation unit and rotatably fastened to the lower fastening unit.

14. The method of claim 13, wherein a connecting unit, that includes at least one body, extends between one side of the upper fastening unit and one side of the lower fastening unit and connects the one side of the upper fastening unit and the one side of the lower fastening unit.

15. The method of claim 13, wherein the at least one body of the rotation unit includes:

a rotation plate that is configured rotate in the first direction between the upper fastening unit and the lower fastening unit; and a tool module detachably provided on one surface of the rotation plate and comprising at least one tool.

16. The method of claim 15, wherein the first hinge unit is at an upper portion of the rotation plate and is rotatably fastened to the upper fastening unit, and the second hinge unit is at a lower portion of the rotation plate and is rotatably fastened to the lower fastening unit.

17. The method of claim 15, wherein the detachably connecting the rotation tool post comprises inserting the fastening member into at least one fastening hole in the upper fastening unit and the lower fastening unit.

18. The method of claim 13, further comprising:

detaching the rotation tool post from a position of the one of the supports; and detachably connecting a cross tool unit to the position of the one of the supports after the rotation tool post is detached, wherein the cross tool unit is configured to perform cutting without rotating in the first direction.

19. The method of claim 13, wherein the machine tool further comprises an additional rotation tool post detachably provided on another one of the supports and rotatable with respect to the first direction perpendicular to the axis line, and the rotation tool post and the additional rotation tool post are independently attached to the supports, respectively, and the rotation tool post and the additional rotation tool post face each other.

20. The method of claim 13, wherein the at least one body of the fastening member comprises:

at least one position pin configured to set a fastening position of the rotation tool post, and a fastening bolt adjacent to the at least one position pin, the fastening bolt configured to fix the rotation tool post to the one of the supports.

* * * * *